(12) United States Patent
Fujishiro et al.

(10) Patent No.: US 8,796,352 B2
(45) Date of Patent: Aug. 5, 2014

(54) ULTRAVIOLET RAY-CURABLE RESIN COMPOSITION USED IN INKJET PRINTING AND OPTICAL ELEMENT OBTAINED USING SAME

(75) Inventors: Koichi Fujishiro, Kisarazu (JP); Masanao Kawabe, Kitakyushu (JP); Tohru Saito, Kisarazu (JP); Takahiro Yoshioka, Kisarazu (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 1 day.

(21) Appl. No.: 13/701,573

(22) PCT Filed: Jun. 9, 2011

(86) PCT No.: PCT/JP2011/063206
§ 371 (c)(1),
(2), (4) Date: Dec. 3, 2012

(87) PCT Pub. No.: WO2011/158725
PCT Pub. Date: Dec. 22, 2011

(65) Prior Publication Data
US 2013/0071632 A1    Mar. 21, 2013

(30) Foreign Application Priority Data
Jun. 14, 2010 (JP) .................................. 2010-135147

(51) Int. Cl.
| | | |
|---|---|---|
| C08F 265/06 | (2006.01) | |
| C09D 11/101 | (2014.01) | |
| C08F 212/36 | (2006.01) | |
| C08F 212/08 | (2006.01) | |
| B29D 11/00 | (2006.01) | |

(52) U.S. Cl.
USPC ........... 522/186; 522/113; 522/114; 522/149; 522/150; 522/184; 522/188; 264/1.1; 264/1.34; 264/1.36; 264/1.38

(58) Field of Classification Search
USPC ............. 522/6, 113, 114, 149, 150, 184, 186, 522/188; 264/1.1, 1.34, 1.36, 1.38
See application file for complete search history.

(56) References Cited

U.S. PATENT DOCUMENTS

| | | | |
|---|---|---|---|
| 5,986,020 A * | 11/1999 | Campbell et al. | ............... 526/64 |
| 7,108,415 B2 | 9/2006 | Hayakawa | |
| 7,402,645 B2 * | 7/2008 | Kawabe | ....................... 526/336 |
| 2006/0177666 A1 * | 8/2006 | Kawabe | ..................... 428/411.1 |
| 2008/0241416 A1 * | 10/2008 | Shimohara et al. | ........... 427/511 |

FOREIGN PATENT DOCUMENTS

| | | |
|---|---|---|
| EP | 2 275 459 B1 | 12/2012 |
| JP | 9-114024 A | 5/1997 |
| JP | 2000-155380 A | 6/2000 |
| JP | 2002-365405 A | 12/2002 |
| JP | 2004-20684 A | 1/2004 |
| JP | 2004-123873 A | 4/2004 |
| JP | 2005-213443 A | 8/2005 |
| JP | 2005-249882 A | 9/2005 |
| JP | 2007-224103 A | 9/2007 |
| JP | 2007-277524 A | 10/2007 |
| JP | 2008-231280 A | 10/2008 |
| WO | WO 9946301 A1 * | 9/1999 |
| WO | WO-2009/110453 A1 | 9/2009 |

OTHER PUBLICATIONS

International Search Report for the Application No. PCT/JP2011/063206 mailed Sep. 13, 2011.
International Preliminary Report on Patentability for Application No. PCT/JP2011/063206 mailed Jan. 24, 2013.

* cited by examiner

*Primary Examiner* — Satya Sastri
(74) *Attorney, Agent, or Firm* — Cheng Law Group, PLLC

(57) ABSTRACT

Provided is a material suitable for an optical element, which can be applied by inkjet, has an ultraviolet curable characteristic, and yields a cured product excellent in transparency and hardness and having a refractive index of more than 1.5. Specifically, an optical element excellent in transparency and hardness and having a refractive index of more than 1.5 is obtained by preparing a resin composition including at least: (A) 5 to 45 mass % of a vinyl group-containing copolymer obtained by copolymerization of a divinyl aromatic compound; (B) 55 to 94 mass % of a liquid photocurable polyfunctional (meth)acrylate having two or more (meth)acryloyl groups; (C) 0.97 to 20 mass % of a photopolymerization initiator; and (D) 0.03 to 1 mass % of a surfactant, and applying the resin composition onto a support substrate by inkjet, followed by photocuring.

8 Claims, No Drawings

ULTRAVIOLET RAY-CURABLE RESIN COMPOSITION USED IN INKJET PRINTING AND OPTICAL ELEMENT OBTAINED USING SAME

TECHNICAL FIELD

The present invention relates to a resin composition which can be applied by an inkjet printing method and has an ultraviolet curable characteristic, and more particularly, to an ultraviolet curable resin composition suitable for an optical element, which yields a cured product excellent in transparency and hardness, and in particular, having a refractive index of more than 1.5. The present invention also relates to an optical element such as a lenticular lens sheet or a microlens sheet, which is obtained by applying the ultraviolet curable resin composition onto a support substrate by the inkjet printing method, followed by curing.

BACKGROUND ART

Microlens and lenticular lens sheets are elements to be used in a back-light unit of a liquid crystal display, a rear-projection display, a projection screen, a stereoscopic display, and the like. In general, a convex lens is formed as a dot or a stripe on a surface of a transparent substrate such as glass or a plastic sheet.

In particular, a three-dimensional display is known as one of the display systems which have at attention as next-generation display systems. Among modes of three-dimensional display, as one which does not require any special glasses, a lenticular mode is typically given (Non Patent Literature 1). Various three-dimensional displays of such mode in combination with a flat panel display such as a liquid crystal display (LCD) have recently been proposed, and thus the mode is considered to be closest to a practical level. However, in the conventional lenticular mode, an image resolution depends on a pitch of a lens or a barrier. Hence, a lens having a higher definition is required for realizing a display having a higher resolution. Further, it is necessary to position a lens and a barrier accurately with respect to a flat panel display.

Meanwhile, a three dimensional display using a field-sequential light direction control back light has recently been proposed as a novel mode of the three-dimensional display (Patent Literature 1). A principle of this mode involves adopting, as a back light of a display, a field-sequential light direction control back light 1 which can change a direction of light (LD) from the back light sequentially at high speed through use of a lenticular lens, and displaying an image depending on the direction of the light on a transmission display 2. Through utilization of this, binocular parallax images are provided in directions of left and right eyes (LE and RE), and the directions are switched at blinding speed, thereby being able to give a three-dimensional image to an observer. Further, an image resolution of this mode is the same as that of an LCD, and hence a high resolution of the LCD can be directly utilize, which facilitates manufacture and an increase in resolution.

Meanwhile, the lenticular lens has a spherical surface profile, and the following methods have hitherto been adopted as processing means therefor. That is, for example, there are given: (1) subjecting a molten or semi-molten thermoplastic resin to injection molding; (2) subjecting a sheet to embossing under heating (see Patent Literature 2); (3) curing an ultraviolet curable resin in a template with ultraviolet light (see Patent Literature 3); and (4) subjecting an ultraviolet curable resin to screen printing, and curing the ultraviolet curable resin with ultraviolet light (see Patent Literature 4).

However, it can be said that each of those methods is a manufacturing method involving the following drawbacks. The manufacturing method requires a mold having high processing accuracy or requires a printing plate. Further, the mold circa plate inevitably comes into contact with a lens surface, and hence it is difficult to eliminate a risk of contamination with foreign matter, and moreover, a flaw in the mold or the like is reflected.

Meanwhile, there has been proposed a method of forming a microlens through use of inkjet or the like (Patent Literature 5). That is, the patent literature relates to a method of forming hemispherical specular dots for preventing incident light from diffusing or scattering, in manufacturing, for example, a light guide plate of a back light to be used in a liquid crystal display apparatus, on one surface or both surfaces of a plastic to serve as a base material for the light guide plate. This method has an advantage in that there is no need to produce a mold, as compared to the manufacturing method using injection molding processing or the like as describe above. In the case of this method, however, a polycarbonate resin or the like to be used as the base material has high surface energy, and hence is highly compatible with a microlens formation material for forming specular dots. Thus, a microlens to be formed undergoes planarization, possibly resulting in a reduction in luminance. In actuality, Patent Literature 5 has no description about a material composition suitable for a profile of the microlens.

It should be noted that Patent Literatures 6 and 7 disclose to soluble polyfunctional vinyl aromatic copolymer obtained by polymerization of a divinyl aromatic compound (a) and a monovinyl aromatic compound (b) in an organic solvent in the presence of a Lewis acid catalyst and an initiator having a specific structure at a temperature of 20 to 100° C. In addition, the soluble polyfunctional vinyl aromatic copolymer is excellent in solvent solubility and processability, and can be used to yield a cured product excellent in heat resistance and thermal decomposition resistance. Further, Patent Literature 8 describes that the copolymer is a material suitable for an optical material. However, there is no attempt to apply the copolymer to an inkjet process in any of the literatures.

CITATION LIST

Patent Literature

[PTL 1] JP 2004-20684 A
[PTL 2] JP 09-114024 A
[PTL 3] JP 2002-365405 A
[PTL 4] JP 2000-155380 A
[PTL 5] JP 2005-249882 A.
[PTL 6] JP 2004-123073 A
[PTL 7] JP 2005-213443 A
[PTL 8] JP 2008-231280 A.

Non Patent Literature

[NPL 1] Takanori Okoshi, "Three-dimensional imaging techniques," Asakura Publishing Co., Ltd. (1991)

SUMMARY OF INVENTION

Technical Problem

As described above, the conventional method mainly uses a mold or a printing plate in obtaining an optical element such as a lenticular lens sheet or a microlens sheet. The mold or the plate inevitably comes into contact with a lens surface of the optical element, and hence there arises a problem of a reduction in yield due to contamination with foreign matter or a flaw. Accordingly, the present invention has been made in order to solve such problem. An object of the present invention is to provide an ultraviolet curable resin composition suitable for an inkjet process so that an optical element is obtained without using any mold or plate.

Solution to Problem

The inventors of the present invention have made extensive studies in order to achieve the object. As a result, the inventors have found that an ultraviolet curable resin composition having a specific composition is excellent in applicability in an inkjet printing method, and hence allows an optical element to be provided in a noncontact manner without using any mask or mold, and allows optical elements having a wide variety of lens profiles to be manufactured at low cost. The inventors also have found that the resultant cured product has characteristics such as a refractive index suitable for an optical element. Thus, the present invention has been completed.

That is, the present invention provides an ultraviolet curable resin composition to be used in an inkjet printing method, including at least:

a component (A): a soluble polyfunctional vinyl aromatic copolymer, which is obtained by copolymerization of 20 to 99 mol % of a divinyl aromatic compound (a) and 1 to 80 mol % of a monovinyl aromatic compound (b), the content of a structural unit containing an unreacted vinyl group represented by the following formula (a1) derived from the divinyl aromatic compound (a) being 10 to 90 mol % with respect to the total molar number of structural units derived from all monomers:

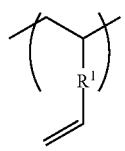

(a1)

where $R^1$ represents an aromatic hydrocarbon group having 6 to 30 carbon atoms;

a component (B): a photocurable polyfunctional (meth)acrylate having at least two (meth)acryloyl groups in the molecule, a component (C): a photopolymerization initiator; and a component (B): a surfactant, in which:

the compounding amount of the component (A) is 5 to 45 mass %, the compounding amount of the component (B) is 55 to 94 mass %, the compounding amount of the component (C) is 0.97 to 20 mass %, and the compounding amount of the component (D) is 0.03 to 1 mass %; and the ultraviolet curable resin composition contains 90 mass % or more of an ultraviolet curable component.

The present invention also provides an optical element, which is obtained by applying the above-mentioned ultraviolet curable resin composition onto a support substrate by an inkjet printing method, and curing the ultraviolet curable resin composition with ultraviolet light.

Hereinafter, the present invention is described in detail.

An ultraviolet curable resin composition of the present invention includes a component (A), a component (B), a component (C), and a component (D), in which the compounding amount of the component (A) is 5 to 45 mass %, the compounding amount of the component (B) is 55 to 94 mass %, the compounding amount of the component (C) is 0.97 to 20 mass %, and the compounding amount of the component (D) is 0.03 to 1 mass %. Of those constituent materials, the components (A), (B), and (C) function as a photosensitive resin composition. Of those, the component (B) is a liquid component for adjusting a viscosity to one suitable for application by inkjet, and the component (A) provides a refractive index of 1.5 or more necessary for an optical element.

The component (A) is a soluble polyfunctional vinyl aromatic copolymer (hereinafter, also referred to as copolymer (A)) which is obtained by copolymerization of 20 to 99 mol % of a divinyl aromatic compound (a) and 1 to 80 mol % of a monovinyl aromatic compound (b), the content of a structural unit containing an unreacted vinyl group represented by the formula (a1) (hereinafter, referred to as structural unit (a1)) derived from the divinyl aromatic compound (a) being 10 to 90 mol % with respect to the total molar number of structural units derived from all monomers constituting the copolymer.

That is, the copolymer (P) has a structural unit (a) derived from the divinyl aromatic compound (a) and a structural unit (b) derived from the monovinyl aromatic compound (b), and the structural unit (a1) represented by the formula (a1) is one kind of the structural unit (a) and occupies part or the structural unit (a). It should be noted that the term "soluble" when used in reference to the copolymer (A) means that the copolymer is soluble in the photocurable polyfunctional (meth)acrylate as the component (B).

Further, the copolymer (A) is a soluble polyfunctional vinyl aromatic copolymer obtained by copolymerization of monomers including a divinyl aromatic compound, and hence has a branched structural unit and other structural units derived from the divinyl aromatic compound. In this regard, the amount of a cross-linked structural unit present in the copolymer is limited to such an amount that solubility is exhibited. That is, the copolymer is a polyfunctional vinyl aromatic copolymer having a predetermined amount of the structural unit (a1). The unreacted vinyl group, which is also called a pendant vinyl group, in the structural unit (a1) is polymerizable and hence can be polymerized by a further polymerization treatment to give a solvent insoluble photocurable resin. Further, an increase in the number of branched structural units can lead to an increase in the number of terminals. It should be noted that the soluble polyfunctional vinyl aromatic copolymer as described above has been disclosed in, for example, Patent Literatures 6, 7, and 8 described above, and can be understood with reference to the descriptions thereof.

The copolymer (A) is obtained by copolymerization of 20 to 99 mol % of a divinyl aromatic compound (a) and 1 to 80 mol % of as monovinyl aromatic compound (b), and hence has a structural unit derived from the divinyl aromatic compound (a) and a structural unit derived from the monovinyl aromatic compound (b) at a ratio substantially corresponding to the composition ratio of the monomers. The copolymer (A) contains preferably 25 to 95 mol %, more preferably 30 to 90 mol % of the structural unit (a) derived from the divinyl aromatic compound, with respect to structural units derived from all monomers. A case where the content of the structural unit (a) is less than 20 mol % is not preferred because the heat resistance of a cured product becomes insufficient. Further, a case where the content of the structural unit (a) derived from the divinyl aromatic compound (a) is more than 99 mol % is not preferred because of a reduction in solubility.

The divinyl aromatic compound (a), which not only branches or cross-links the copolymer (A) but also generates the structural unit (a1) having a pendant vinyl group, plays an important role as a cross-linking component for causing the copolymer (A) to express heat resistance upon curing of the copolymer.

Examples of the divinyl aromatic compound (a) which may be used include, but not limited to, divinylbenzene (including both of m- and p-isomers), divinylnaphthalene (including isomers), and divinylbiphenyl (including isomers). Further, those compounds may be used alone or in combination of two or more kinds thereof. In particular, divinylbenzene (including both of m- and p-isomers) is preferred from the viewpoints of cost and availability, and in the case where higher heat resistance is required, divinylnaphthalene (including isomers) or divinylbiphenyl (including isomers) is preferably used. The divinyl aromatic compound (a) acts as means for increasing the refractive index of a cured product as well as heat resistance.

The structural unit (a1) represented by the formula (a1) is generated from the divinyl aromatic compound (a). Hence, $R^1$ in the formula (a1) can be understood from the divinyl aromatic compound (a). That is, it can be understood that in the case of using divinylbenzene as the divinyl aromatic compound, $R^1$ represents a phenylene group, and in the case of using any other divinyl aromatic compound such as divinylbiphenyl, $R^1$ represents a moiety generated by removing two vinyl groups from the compound.

On the other hand, the monovinyl aromatic compound (b) is used in combination with the divinyl aromatic compound (a) to improve the solubility of the copolymer (A). Examples of the monovinyl aromatic compound (b) include, but limited to, styrene, nuclear alkyl-substituted monovinyl aromatic compound, an α-alkyl-substituted monovinyl aromatic compound, a β-alkyl-substituted styrene, and an alkoxy-substituted styrene. Further, in order to prevent the gelation of a polymer and to improve the solubility in a solvent to be added as necessary, styrene, ethylvinylbenzene (including both of m- and p-isomers), or ethylvinylbiphenyl (including isomers) is particularly preferred from the viewpoints of cost and availability.

Further, a structural unit derived from an additional monomer component (c) such as a tri vinyl aromatic compound, a tri aliphatic compound, a divinyl aliphatic compound, or a monovinyl aliphatic compound, in addition to the structural units derived from the monovinyl aromatic compound (b) and the divinyl aromatic compound (a), may be introduced into the copolymer (A) as long as the effect of the present invention is not impaired.

Specific examples of the additional monomer component (c) include, but not limited to, 1,3,5-trivinylbenzene, 1,3,5-trivinylnaphthalene, 1,2,4-trivinylcyclohexane, ethylene glycol diacrylate and butadiene. Those components may be used alone or in combination of two or more kinds thereof. A structural unit (c) derived from the additional monomer component (c) is used in the range of less than 30 mol % with respect to the total amount of the structural unit (a) derived from the monomer component (a) and the structural unit (b) derived from the monomer component (b).

The copolymer (A) has a number-average molecular weight Mn (where Mn represents a number-average molecular weight in terms of standard polystyrene to be measured through use of gel permeation chromatography) of preferably 500 to 20,000, more preferably 500 to 10,000. Mn of 100,000 or more is undesirable because a gel is liable to be generated and a viscosity becomes high. In addition, a value for a molecular weight distribution (Mw/Mn) to be determined from Mn and a weight-average molecular weight Mw is preferably 2 to 10.

The copolymer (A) may be obtained by cationic copolymerization of the above-mentioned monomers in the presence of a Lewis acid catalyst (I) and one or more kinds of co-catalysts (II) selected from ester compounds.

Next, a manufacturing method for the copolymer (A) is described. The manufacturing method for the copolymer (A) involves copolymerization of monomer components containing 20 to 99 mol %, preferably 25 to 95 mol %, more preferably 30 to 90 mol % of the divinyl aromatic compound (a) and 80 to 1 mol %, preferably 75 to 5 mol %, more preferably 70 to 10 mol % of the monovinyl aromatic compound. In this case, the additional monomer component (c) may be used at less than 30 mol % as described above.

The Lewis acid catalyst (I) to be used in the manufacture of the copolymer (A) may be used without any particular limitation as long as the catalyst is a compound formed of a metal ion (acid) and a ligand (base) and can accept an electron pair. In that case, a co-catalyst or a molecular weight his adjuster (chain transfer agent) may be added. Further, a collection method for the copolymer after the termination of a polymerization reaction is not particularly limited, and for example, a method to be generally employed, such as a steam stripping method or precipitation in a poor solvent, may be employed.

Next, the component (B) is described. The photocurable polyfunctional (meth)acrylate having at least two (meth) acryloyl groups in the molecule is used as the component (B).

Specific examples of the component (B) include polyethylene glycol di(meth)acrylate, tripropylene glycol di(meth)acrylate, trimethylolpropane tri(meth)acrylate, trimethylolpropane polyethoxy tri(meth)acrylate, ditrimethylolpropane tetra(meth)acrylate, glycerin polypropoxy tri(meth)acrylate, di(meth)acrylate of hydroxypivalic acid neopentyl glycol ε-caprolactone adduct (e.g., KAYARAD HX-220 and HX-620 manufactured by Nippon Kayaku Co., Ltd.) pentaerythritol tetra(meth)acrylate, poly(meth)acrylate as a reaction product between dipentaerythritol and ε-caprolactone, dipentaerythritol hexa(meth)acrylate, dipentaerythritol penta (meth)acrylate, tripentaerythritol octa(meth)acrylate, tripentaerythritol hepta(meth)acrylate, and an epoxy(meth)acrylate as a reaction product between a polyglycidyl compound and (meth)acrylic acid In this context, examples of the polyglycidyl compound include polyethylene glycol diglycidyl ether, polypropylene glycol diglycidyl ether, 1,6-hexanediol diglycidyl ether, hexahydrophthalic acid diglycidyl ester, glycerin polyglycidyl ether, glycerin polyethoxyglycidyl ether, trimethylolpropane polyglycidyl ether, and trimethylolpropane polyethoxy polyglycidyl ether.

In addition to the foregoing, specific examples of the component (B) include a polyfunctional urethane acrylate as a reaction product between a hydroxy group-containing polyfunctional (meth)acrylate and a polyisocyanate compound. In this context, examples of the hydroxy group-containing polyfunctional (meth)acrylate include pentaerythritol tri(meth)acrylate, dipentaerythritol penta(meth)acrylate, and tripentaerythritol hepta(meth)acrylate, and examples of the polyisocyanate compound include tolylene diisocyanate, isophorone diisocyanate, xylylene diisocyanate, hexamethylene diisocyanate, and p-phenylene diisocyanate.

Those components (B) may be used alone or as a mixture of two or more kinds thereof. Of those, a diacrylate or triacrylate compound having a viscosity of 30 mPa·sec or less at 20° C. to 45° C. is preferred. In addition, a diacrylate or triacrylate compound having a boiling point of more than 200° C. is preferably used in consideration of dimensional stability after application by inkjet.

Next, the photopolymerization initiator as the component (C) is described. Examples of the photopolymerization initiator include: benzoins such as benzoin, benzoin methyl ether, benzoin ethyl ether, benzoin propyl ether, and benzoin isobutyl ether; acetophenones such as acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexyl phenyl ketone, and 2-methyl-1-[4-(methylthio)phenyl]-2-morpholinopropan-1-one; anthraquinones such as 2-ethylanthraquinone, 2-tert-butylanthraquinone, 2-chloroanthraquinone, and 2-amylanthraquinone; thioxanthones such as 2,4-diethylthioxanthone, 2-isopropylthioxanthone, and 2-chlorothioxanthone; ketals such as acetophenone dimethyl betel and benzyl dimethyl ketal; benzophenones such as benzophenone, 4-benzoyl-4'-methyldiphenyl sulfide, and 4,4'-bismethylaminobenzophenone; and phosphine oxides such as 2,4,6-trimethylbenzoyldiphenylphosphine oxide and bis(2,4,6-trimethylbenzoyl)-phenylphosphine oxide.

Those components may be used alone or as a mixture of two or more kinds thereof, and may be used in combination with, for example, an accelerator, e.g., a tertiary amine such as triethanolamine or methyldiethanolamine, or a benzoic acid derivative such as N,N-dimethylaminobenzoic acid ethyl ester or N,N-dimethylaminobenzoic acid isoamyl ester.

A commercially available product of the photopolymerization initiator is exemplified by Irgacure 184, 369, 651, 500, 819, 907, 784, and 2959, CGI-1700, -1750, and -1850, CG24-61, and Darocur 1116 and 1173 (all of which are manufactured by Ciba. Specialty Chemicals Inc.), Lucirin TPO, LR8893, and LR8970 (all of which are manufactured by BASF), and Ubecryl P36 (manufactured by UCB).

Further, as the surfactant as the component (D), a commercially available silicon-based surfactant, fluorine-based surfactant, nonionic surfactant, and the like may be used alone or as a mixture of two or more kinds thereof. Examples of the fluorine-based surfactant include MEGAFACE series manufactured by DIC Corporation, and examples of the silicon-based surfactant include BYK series manufactured by BYK-Chemie Japan K.K.

The addition amount of the surfactant is 0.03 mass % to 1 mass % with respect to the whole resin composition. The surfactant is added so that an inkjet ultraviolet curable resin composition has a surface tension of 20 to 32 mN/m at an inkjet head temperature upon application. When the surface tension is more than 32 mN/m, an ejection amount does not become stable at the initial stage of inkjet election, and an ink is not ejected in some cases. When the surface tension is less than 20 mN/m, a nozzle surface is contaminated, and impingement accuracy lowers.

The compounding amounts of the above-mentioned essential components are as follows: the compounding amount of the component (A) is 5 to 45 mass %; the compounding amount of the component (B) is 55 to 94 mass %; the compounding amount of the component (C) is 0.97 to 20 mass %; and the compounding amount of the component (D) is 0.03 to 1 mass %. Further, an ultraviolet curable component is contained at 90 mass % or more. In this context, the phrase "ultraviolet curable component is contained at 90 mass % or more" specifically means that the total amount of the component (A), the component (B), and the component (C) is 90 mass % or more.

With regard to the compounding ratio of each of the components in the ultraviolet curable resin composition of the present invention, when the compounding ratio of the component (A) is less than 5 mass %, a refractive index of 1.5 or more necessary for an optical element may not be achieved. Further, when the compounding ratio is more than 45 mass %, a viscosity exceeds 40 mPa·sec (20° C. to 45° C.), which is the upper limit of a viscosity suitable for inkjet ejection, resulting in difficulty in achieving a stable ejection amount. Further, when the compounding amount of the component (B) is more than 95 mass %, a refractive index of 1.5 or more may not be achieved as is the case with the component (A). Further, when the compounding amount is less than is 55 mass %, a viscosity exceeds 40 mPa·sec (20° C. to 45° C.), which is the upper limit of a viscosity suitable for inkjet ejection. In addition, when the compounding amount of the component (C) is less than 0.97 mass %, the tack of a cured product is not eliminated by a substantial amount of irradiation with ultraviolet light. When the compounding amount is more than 20 mass %, a cured product is brittle, and yellowing upon heating becomes a problem. Moreover, when the compounding amount of the component (D) is less than 0.03 mass %, there arise drawbacks in that an ejection amount does not become stable at the time of the start of inkjet ejection, and a bulge occurs in a large amount at the time of line drawing, for example. When the compounding amount is more than 1 mass %, an inkjet nozzle is contaminated, resulting in a reduction in droplet impingement accuracy.

When a cured product formed of the ultraviolet curable resin composition of the present invention is used for an optical application, dimensional stability upon curing is important. Therefore, the resin composition preferably contains 90 mass % or more of a component having a boiling point of 200° C. or more under atmospheric pressure. When the content is less than 90 mass %, evaporation after ejection makes the volume unstable. Further, the reason why the ultraviolet curable component to be cured is incorporated at 90 mass % or more as described above is that when the content of the curable components is less than 90 mass %, characteristics of a cured product do not become stable, such as a variation in refractive index under its use environment.

The thus obtained resin composition is prepared so as to have a viscosity of 5 to 40 mP·sec and a surface tension of 20 to 32 mM/m, more preferably 20 to 30 mN/m at a head temperature of 20 to 45° C. in order that the resin composition may be ejected stably by an inkjet printing method. An inkjet head suitable for applying such resin composition is of a piezo mode, and for example, there may be used ones manufactured by XAAR, manufactured by SUPECTRA, manufactured by Konica Minolta Holdings, Inc., manufactured by TOSHIBA TEC CORPORATION, and manufactured by Ricoh Printing Systems, Ltd. An electrostatic inkjet head is also commercially available, and in this case, a wider range of viscosities is allowable.

A droplet ejected from inkjet is drawn as a dot or a line on a support substrate. When the droplet is utilized as an optical element such as a lens, a surface of the droplet after curing desirably has a convex profile. To this end, as described above, the resin composition for inkjet contains 90 mass % or more of a component having a boiling point of 200° C. or more under atmospheric pressure, and contains 90 mass % or more of an ultraviolet curable component to be cured, thereby providing such a preferred result that the droplet is cured on a support substrate while having a convex profile.

Further, in order to form a linear cured product on a support substrate, it is recommended to set a static contact angle formed by the resin composition and the support substrate to 5° or more and 30° or less, preferably 20° or less. This allows a line satisfactory in linearity in which a bulge occurs in a small amount to be formed, and thus the resin composition is suitable for forming a lenticular lens.

As described above, the ultraviolet curable resin composition of the present invention can be applied by an inkjet printing method, has an ultraviolet curable characteristic, and yields a cured product excellent in transparency and hardness and having a refractive index of more than 1.5, and hence is a material suitable for an optical element. In addition, for example, an optical element such as a lenticular lens sheet or a microlens sheet can be obtained by applying the ultraviolet curable resin composition of the present invention onto a support substrate through use of an inkjet printing method, and curing the ultraviolet curable resin composition by irradiation with ultraviolet light. Moreover, a projection display, a stereoscopic display, and the like can be formed through use of the optical element.

DESCRIPTION OF EMBODIMENTS

Next, the present invention is described in more detail by way of examples, but the present invention is by no means limited by these examples. It should be noted that the term "part(s)" in the following description means "part(s) by mass."

Synthesis example of component A; synthesis of phenylethyl methacrylate-terminated polydivinylbenzene (PDV)

3,320 g (25.50 mol) of divinylbenzene, 1,950 g (15.0 mol) of ethylvinylbenzene, 1,096 g (10.5 mol) of styrene, 6,311 g (30.6 mol) of 2-phenoxyethyl methacrylate, and 8,650 g of toluene were loaded into a 30-L reactor. To the reactor were added 354.8 g of a boron trifluoride-diethyl ether complex at 50° C., and the mixture was subjected to a reaction for 3 hours. The polymerization solution was quenched with a sodium bicarbonate aqueous solution. After that, the oil layer was washed three times with pure water, and the reaction mixed liquid was poured into a large amount of methanol at room temperature to precipitate a polymer. The resultant polymer was washed with methanol, separated by filtration, dried, and weighed to afford 5,640 g (yield: 88.6 mass %) of a copolymer A.

The resultant copolymer A had a number-average molecular weight Mn of 2,690, a weight-average molecular weight Mw of 5,160, and Mw/Mn of 1.92. The copolymer A was subjected to 13C-NMR and 1H-NHR analyses. As a result, a resonance line derived from a 2-phenoxyethyl methacrylate terminal was observed. The copolymer A was subjected to elemental analysis and the results were as follows: C: 86.9 mass %; H: 7.4 mass %; and O: 5.7 mass %. The introduction amount (a) of a structural unit derived from 2-phenoxyethyl methacrylate in the soluble polyfunctional vinyl aromatic polymer, which as calculated from the elemental analysis results and the number-average molecular weight in terms of standard polystyrene, was 3.2 (units/molecule). Further, the copolymer contained 60.0 mol % of a structural unit derived from divinylbenzene and 40.0 mol % in total of structural units derived from styrene and ethylvinylbenzene. The vinyl group content of the copolymer A was 37 mol %. Further, TMA measurement results showed that the copolymer had Tg of 272° C. and a softening temperature of 300° C. or more. TGA measurement results showed that a mass decrease was 1.5 mass % at 300° C. and thermal discoloration resistance was evaluated as A. The result the total light transmittance measured with a turbidimeter was 88%. The copolymer A was soluble in toluene, xylene, THF, dichloroethane, dichloromethane, and chloroform, and no gel was found to be generated. It should be noted that in the measurement of the molecular weights, the molecular weight distribution, and the like in the synthesis example, sample preparation and measurement were performed by a method shown below, i.e., were performed through use of a GPC (HLC-8120GPC manufactured by Tosoh Corporation) using a tetrahydrofuran as a solvent at a flow rate of 1.0 ml/min and column temperature of 38° C., and through use of a calibration curve with monodisperse polystyrene.

EXAMPLES

Example 1

Preparation of Ultraviolet Curable Resin Composition (P1)

15 parts of the phenylethyl methacrylate-terminated polydivinylbenzene (PDV) described above, 5 parts of trimethylolpropane triacrylate, 9 parts of 2-hydroxyethyl acrylate, 50 parts of 1,4-butanediol diacrylate, 20 parts of 1,9-nonanediol diacrylate, 7 parts of Irgacure 184 (manufactured by Ciba Specialty Chemicals Inc.), 0.05 part of ADK STAB AO-60 (manufactured by ADEKA CORPORATION), and 1.1 parts of a diethylene glycol diacetate solution containing 10% of a surfactant BYK 378 (manufactured by BYK-Chemie Japan K.K.) were mixed to form a homogeneous solution. The solution was filtered through a 0.2-μm microfilter to prepare an ultraviolet curable resin ink (P1). The ink had a viscosity of 19.9 mPa·sec, a surface tension of 25.1 mN/m, and a density of 1,055 kg/m$^3$.

A 5-inch alkali-free glass AN-100 (manufactured by ASAHI GLASS CO., LTD.) was used and subjected to a deep UV treatment for 1 minute in advance (substrate I-1). The wettability of a surface of the substrate was measured with the ultraviolet curable resin ink (P1) obtained in the foregoing. As a result, its contact angle was found to be 9.1°. In this case, conditions for the measurement of the contact angle were as follows: 0.5 μl of the ink (P1) was dropped onto a barrier coating film surface to measure a contact angle 1 second after the dropping (measurement temperature: 23° C.) through use of OCH200 manufactured by Data Physics Corporation.

<Production of Lenticular Lens>

A 10-minute continuous ejection test on the ultraviolet curable resin ink (P1) was performed through use of an inkjet head (KM512L, specification: 42 pl) manufactured by Konica Minolta Holding, Inc. at a driving frequency of 4.8 kHz and an applied voltage of 17.84 V. The ink did not cause any nozzle clogging and exhibited a satisfactory ejection characteristic.

As a target lenticular lens sheet, a lens pitch w0, a lens height h0, and a lens contact angle θ0 were set to 135 μm, 4.82 μm, and 8.2°, respectively, and the substrate I-1 was used to produce a lenticular lens. KM512L was used as an inkjet head, and a UV-LED in-line exposure head was mounted 50 mm behind the inkjet head. Drawing was performed at a stage speed of 125 mm/sec and a dot pitch of 75 μm/drop through use of one nozzle of KM512L, and UV-LED in-line exposure was performed on a stage immediately after the drawing. A cumulative amount of exposure at this time was 40 mJ/cm$^2$. A state and profile immediately after the in-line exposure were measured through use of a light microscope and an optical interference surface profilometer WYCONT1100 (manufactured by Veeco japan), respectively. As a result, a line satisfactory in linearity and having a width w of 135 μm, a height h of 5.4 μm, and a contact angle of 9.1° was found to be formed.

Subsequently, exposure was performed at 3,000 mJ/cm$^2$ with a one-shot exposure machine (manufactured by Japan Science Engineering Co., Ltd., illuminance: 50 mW/cm$^2$). In addition, a heat treatment was performed at 80° C. for 15 minutes. It was confirmed by SEM observation that the line showed a smooth and spherical surface profile even after the heat treatment. It was also confirmed that the line had a width w of 135 μm, a height h of 4.83 μm, and a contact angle of 8.2° and showed as target profile.

Examples 2 and 3

Resin composition inks P2 and P3 were prepared by changing compositions as shown in Table 1. The physical property values were similarly shown in Table 1.

It should be noted that compounds in Table 1 and Table 2 are as described below.

SR-213; 1,4-butanediol diacrylate manufactured by Sartomer Japan. Inc.

LIGHT ACRYLATE 1,9ND-A; 1,9-nonanediol diacrylate manufactured by Kyoeisha Chemical Co., Ltd.

LIGHT ESTER HOA; 2-hydroxyethyl acrylate manufactured by Kyoeisha Chemical Co., Ltd.

BYK378; silicon-based surfactant manufactured by BYK-Chemie Japan K.K.

SR-351S; trimethylolpropane triacrylate (TMPTA) manufactured by Sartomer Japan Inc.

Irgacure 819; Irgacure 819 (bis(2,4,6-trimethylbenzoyl)-phenylphosphine oxide) manufactured by Ciba Specialty Chemicals Inc.

Irgacure 184; Irgacure 184 (1-hydroxy-cyclohexyl-phenyl-ketone) manufactured by Ciba Specialty Chemicals Inc.

Irgacure 907; Irgacure 907 (2-methyl-1-[4-(methylthio)phenyl]-2-morpholinopropan-1-one) manufactured by Ciba Specialty Chemicals Inc.

ECA; ethyl cellosolve acetate

EGDAC; diethylene glycol diacetate

ADK STAB AO-60; polymerization inhibitor manufactured by ADEKA CORPORATION

MEGAFACE F470; fluorine-based surfactant manufactured by DIC Corporation

Further, measurement methods for the physical property values shown in Table 1 and Table 2 are as described below.

Viscosity; measured at 23° C. through use of an E-type viscometer.

Contact angle; 0.5 μl each of the ultraviolet curable resin compositions (P and Q) was dropped onto a barrier coating film surface to measure a contact angle 1 second after the dropping (measurement temperature: 23° C.) through use of OCH200 manufactured by Data Physics Corporation.

Surface tension; measured by a platinum substrate immersion method.

Refractive index; a cured film was produced and measured for its refractive index at a wavelength of 589 nm at 25° C. through use of an Abbe refractometer DR-M2 manufactured by ATAGO CO., LTD.

Transmittance; a cured film having a thickness of 5 μm was used and measured for its light transmittance at 400 nm with a spectrophotometer U3200 (manufactured by Hitachi, Ltd.).

Cured product profile; observed with a light microscope and an SEM.

TABLE 1

| Ultraviolet curable resin composition | | Example 1 P1 | Example 2 P2 | Example 3 P3 | Example 4 P1 | Example 5 P4 | Example 6 P5 | Example 7 P6 |
|---|---|---|---|---|---|---|---|---|
| A Component | PDV | 15.0 | 15.0 | 15.0 | 15.0 | 15.0 | 15.0 | 15.0 |
| B Component | SR-213 | 50.0 | 60.0 | 50.0 | 50.0 | 50.0 | 50.0 | 50.0 |
| | LIGHT ACRYLATE 1,9ND-A | 20.0 | 20.0 | 20.0 | 20.0 | 20.0 | 20.0 | 20.0 |
| | SR-351S | 5.0 | 5.0 | 15.0 | 5.0 | 5.0 | 5.0 | 5.0 |
| Another acryl | LIGHT ESTER HOA | 9.0 | | | 9.0 | 9.0 | 9.0 | 9.0 |
| C Component | Irgacure 907 | | | | | 7.0 | | |
| | Irgacure 819 | | | | | | | 7.0 |
| | Irgacure 184 | 7.0 | 7.0 | 7.0 | 7.0 | | 20.0 | |
| D Component | BYK378 | 0.1 | 0.1 | 0.1 | 0.1 | 0.1 | 0.1 | 0.1 |
| | MEGAFACE F470 | | | | | | | |
| Additive | ECA | | | | | | | |
| | ADK STAB AO-60 | 0.05 | 0.05 | 0.05 | 0.05 | 0.05 | 0.05 | 0.05 |
| | EGDAC | 0.9 | 0.9 | 0.9 | 0.9 | 0.9 | 0.9 | 0.9 |
| Liquid physical properties | Viscosity (mPa · s), 23° C. | 20 | 22 | 30 | 20 | 20 | 23 | 20 |
| | Surface tension (mN/m), 23° C. | 25.1 | 24.8 | 25.5 | 25.1 | 25.1 | 26.1 | 25.2 |
| | IJ ejection property *1 | ○ | ○* | ○* | ○ | ○ | ○ | ○ |
| Cured product physical properties | Transmittance (wavelength: 400 nm, film thickness: 5 μm) | 98.8% | 99.0% | 98.5% | 98.8% | 98.8% | 97.1% | 98.8% |
| | Refractive index | 1.53 | 1.53 | 1.53 | 1.53 | 1.53 | 1.54 | 1.53 |
| | Film residual rate *2 | 85% | 88% | 88% | 92% | 92% | 88% | 88% |
| Support substrate | Kind | Glass/UV | Glass/UV | Glass/UV | Glass/Acetone | Glass/UV | Glass/UV | Glass/UV |
| | Contact angle | 9.1° | 9.1° | 9.1° | 12° | 9.1° | 9.2° | 9.1° |
| Drawing profile | Surface profile | Convex | Convex | Convex | Convex | Convex | Convex | Convex |
| | Linearity and dot circularity | Good linearity | Good linearity | Good linearity | Good dot circularity | Good linearity | Good linearity | Good linearity |

*1) Inkjet head temperature; generally 23° C., tested at 35° C. in the case of *.
*2) Film residual rate; film thickness retention rate from immediately after impingement on a substrate to UV curing and a heat treatment at 80° C. for 3 minutes.

TABLE 2

| Ultraviolet curable resin composition | | Example 8 P7 | Example 9 P8 | Example 10 P9 | Comparative Example 1 Q1 | Comparative Example 2 Q2 | Comparative Example 3 Q3 |
|---|---|---|---|---|---|---|---|
| A Component | PDV | 15.0 | 7.0 | 30.0 | 15.0 | 0.0 | 15.0 |
| B Component | SR-213 | 50.0 | 60.0 | 45.0 | 50.0 | 60.0 | 50.0 |
| | LIGHT ACRYLATE 1,9ND-A | 20.0 | 20.0 | 10.0 | 20.0 | 25.0 | 20.0 |
| | SR-351S | 5.0 | 13.0 | 5.0 | 5.0 | 15.0 | 5.0 |

TABLE 2-continued

| Ultraviolet curable resin composition | | Example 8 P7 | Example 9 P8 | Example 10 P9 | Comparative Example 1 Q1 | Comparative Example 2 Q2 | Comparative Example 3 Q3 |
|---|---|---|---|---|---|---|---|
| Another acryl C Component | LIGHT ESTER HOA | 9.0 | 0.0 | 9.0 | 9.0 | 0.0 | 9.0 |
| | Irgacure 907 | | | | | | |
| | Irgacure 819 | | | | | | |
| | Irgacure 184 | 7.0 | 7.0 | 7.0 | 7.0 | 7.0 | 7.0 |
| D Component | BYK378 | | 0.1 | 0.1 | 0.0 | 0.1 | 0.1 |
| | MEGAFACE F470 | 0.10 | | | | | |
| Additive | ECA | | | | | | 30.0 |
| | ADK STAB AO-60 | 0.05 | 0.05 | 0.05 | 0.05 | 0.05 | 0.05 |
| | EGDAC | 0.9 | 0.9 | 0.9 | 0.0 | 0.9 | 0.9 |
| Liquid physical properties | Viscosity (mPa · s), 23° C. | 20 | 20 | 33 | 21 | 18 | 15 |
| | Surface tension (mN/m), 23° C. | 26.3 | 25.0 | 28.0 | 25.0 | 24.0 | 25.0 |
| | IJ ejection property *1 | ○ | ○ | ○* | X | ○ | ○ |
| Cured product physical properties | Transmittance (wavelength: 400 nm, film thickness: 5 μm) | 98.5% | 99% | 97.0% | 98.8% | 98.5% | 98.5% |
| | Refractive index | 1.53 | 1.51 | 1.57 | 1.53 | 1.48 | 1.53 |
| | Film residual rate *2 | 88% | 86% | 90% | 88% | 85% | — |
| Support substrate | Kind | Glass/UV | Glass/UV | Glass/UV | — | Glass/UV | Glass/UV |
| | Contact angle | 9.1° | 9.0° | 9.3 | — | 8.5° | 7.0° |
| Drawing profile | Surface profile | Convex | Convex | Convex | — | Convex | Flat top |
| | Linearity and dot circularity | Good linearity | Good linearity | Good linearity | — | Good linearity | Good linearity |

*1) Inkjet head temperature; generally 23° C., tested at 35° C. in the case of *.
*2) Film residual rate; film thickness retention rate from immediately after impingement on a substrate to UV curing and a heat treatment at 80° C. for 3 minutes.

Through use of an inkjet head (KM512L, specification: 42 pl) manufactured by Konica Minolta Holdings, Inc., 10-minute continuous ejection tests on the ultraviolet curable resin inks P2 and P3 were performed at a driving frequency of 4.8 kHz, an applied voltage of 17.84 V, and a head temperature set to 35° C. Each of the inks did not cause any nozzle clogging and exhibited a satisfactory ejection characteristic. Further, line drawing was performed on the alkali-free glass substrate I-1 under the same conditions as in Example 1. It was confirmed that each line showed an upwardly convex spherical lens profile, and a contact line with the substrate was a straight line.

Example 4

A 5-inch alkali-free glass substrate (AN-100 manufactured by ASAHI GLASS CO., LTD.) was washed with acetone and dried. Then, a substrate I-2 having as contact angle of 12° with respect to the resin ink P1 was prepared.

Subsequently, through use of an inkjet head (KM512SH, specification: 4 pl) manufactured by Konica Minolta Holdings, Inc., a 10-minute continuous ejection test on the ultraviolet curable resin ink (P1) was performed at a driving frequency of 4.8 kHz and an applied voltage of 18.54 V. The ink did not cause any nozzle clogging and exhibited a satisfactory ejection characteristic.

Through use of one nozzle of KM512SH, dot drawing was performed at a stage speed of 125 mm/sec and a dot pitch of 75 μm/drop, and immediately after that, exposure was performed with a UV in-line exposure machine (manufactured by HOYA-SCOTT, run at 125 mm/sac, cumulative amount of exposure: 64 mJ/cm$^2$) on an inkjet stage. In addition, exposure was performed at 2,000 mJ with a one-shot exposure machine (illuminance: 50 mJ/cm$^2$). It was confirmed by SEM observation that each dot showed a smooth and spherical surface profile even after a heat treatment. It was also confirmed that each dot had a diameter D of 47.7 μm and a height h of 3.0 μm and showed a convex lens profile.

Examples 5 to 7

Ultraviolet in compositions (P4 to P6) were prepared in the same manner as in Example 1 except that the kind of the photopolymerization initiator and the addition amount thereof were changed as shown in Table 1, and evaluated in the same manner. Table 1 shows the results. Each of the compositions exhibited satisfactory inkjet ejection property. Further, line drawing was performed on the alkali-free glass substrate I-1 under the same conditions as in Example 1. It was confirmed that each line showed an upwardly convex spherical lens profile, and a contact line with the substrate was a straight line.

Example 8

An ultraviolet curable resin composition P8 was prepared in the same manner as in Example 1 except that the kind of the surfactant was changed to a fluorine-based surfactant as shown in Table 2. Line drawing was performed on the alkali-free glass substrate I-1 under the same conditions as in Example 1. It was confirmed that each line showed an upwardly convex spherical lens profile, and a contact line with the substrate was a straight line.

Examples 9 and 10

Resin composition inks P9 and P10 were prepared by changing compositions as shown in Table 2. The physical property values were similarly shown in Table 2.

Through use of an inkjet head (KM512L, specification: 42 pl) manufactured by Konica Minolta Holdings, Inc., 10-minute continuous election tests on the ultraviolet curable resin inks P9 and P10 were performed at a driving frequency of 4.8 kHz, an applied voltage of 17.84 V, and a head temperature set to 35° C. Each of the inks did not cause any nozzle clogging and exhibited a satisfactory ejection characteristic.

Further, line drawing was performed on the alkali-free glass substrate I-1 under the same conditions as in Example 1. It was confirmed that each line showed an upwardly convex spherical lens profile, and a contact line with the substrate was a straight line.

Comparative Example 1

An ultraviolet curable resin composition Q1 was prepared in the same manner as in Example 1 except that no surfactant was used as shown in Table 2. Through use of an inkjet head (KM512L, specification: 42 pl) manufactured by Konica Minolta Holdings, Inc., an ejection test was performed at a driving frequency of 4.8 kHz and arm applied voltage of 17.84 V. In this case, a large number of non-ejecting nozzles were observed when election was restarted after a certain waiting period.

Comparative Example 2

An ultraviolet curable resin composition Q2 using no component A as shown in Table 2 was prepared. A cured film was produced in the same manner as in Example 1. As a result, the film had a refractive index of 1.48.

Reference Example

As shown in Table 2, an ultraviolet curable resin composition (Q3) was prepared by adding 30 parts of ethyl cellosolve acetate (ECA) (boiling point: 156° C.) with respect to 107.05 parts of the ultraviolet curable resin composition (P1) prepared in Example 1, and an application test on the composition was performed in the same manner as in Example 1. As a result, the composition wetted a large area of a glass substrate as compared to Example 1, and its height did not become stable. Further, its profile after curing included a flat top portion and was not a spherical profile.

The invention claimed is:

1. An ultraviolet curable resin composition to be used in an inkjet printing method, comprising at least:
a component (A): a soluble polyfunctional vinyl aromatic copolymer, which is obtained by copolymerization of 20 to 99 mol % of a divinyl aromatic compound (a) and 1 to 80 mol % of a monovinyl aromatic compound (b), a content of a structural unit containing an unreacted vinyl group represented by the following formula (a1) derived from the divinyl aromatic compound (a) being 10 to 90 mol % with respect to a total molar number of structural units derived from all monomers:

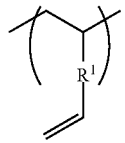

(a1)

where $R^1$ represents an aromatic hydrocarbon group having 6 to 30 carbon atoms;
a component (B): a photocurable polyfunctional (meth) acrylate having at least two (meth)acryloyl groups in a molecule;
a component (C): a photopolymerization initiator; and
a component (D): a surfactant,
wherein:
a compounding amount of the component (A) is 5 to 45 mass %, a compounding amount of the component (B) is 55 to 94 mass %, a compounding amount of the component (C) is 0.97 to 20 mass %, and a compounding amount of the component (D) is 0.03 to 1 mass %; and
the ultraviolet curable resin composition contains 90 mass % or more of an ultraviolet curable component.

2. An ultraviolet curable resin composition according to claim 1, wherein the ultraviolet curable resin composition contains 90 mass % or more of a component having a boiling point of 200° C. or more.

3. An ultraviolet curable resin composition according to claim 1, wherein the ultraviolet curable resin composition has a surface tension of 20 to 32 mN/m.

4. An optical element, which is obtained by applying the ultraviolet curable resin composition according to claim 1 onto a support substrate by an inkjet printing method, and curing the ultraviolet curable resin composition with ultraviolet light.

5. An ultraviolet curable resin composition according to claim 2, wherein the ultraviolet curable resin composition has a surface tension of 20 to 32 mN/m.

6. An optical element, which is obtained by applying the ultraviolet curable resin composition according to claim 2 onto a support substrate by an inkjet printing method, and curing the ultraviolet curable resin composition with ultraviolet light.

7. An optical element, which is obtained by applying the ultraviolet curable resin composition according to claim 3 onto a support substrate by an inkjet printing method, and curing the ultraviolet curable resin composition with ultraviolet light.

8. An optical element, which is obtained by applying the ultraviolet curable resin composition according to claim 5 onto a support substrate by an inkjet printing method, and curing the ultraviolet curable resin composition with ultraviolet light.

* * * * *